No. 644,530. Patented Feb. 27, 1900.
H. C. MERCER.
TILE AND PROCESS OF PRODUCING SAME.
(Application filed July 3, 1899.)
(No Model.)
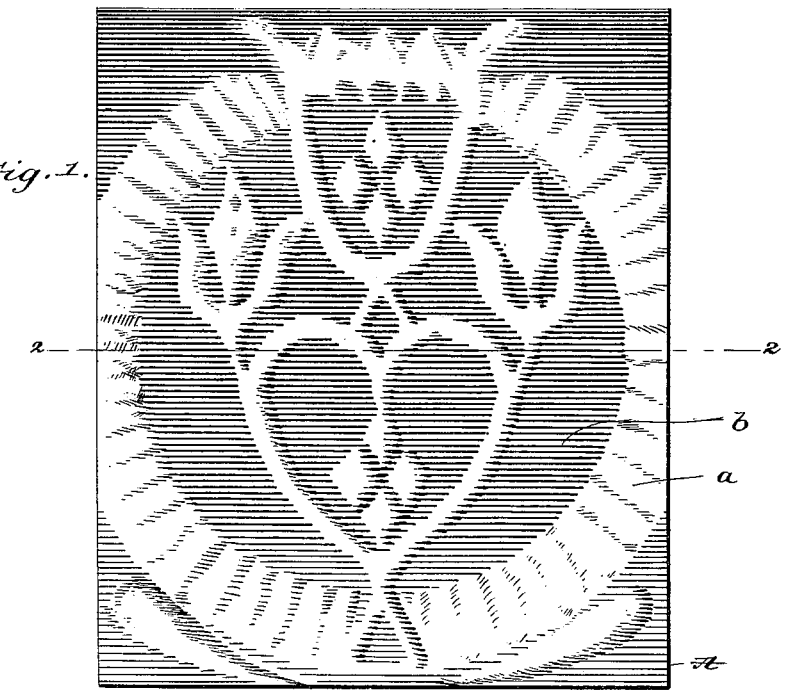
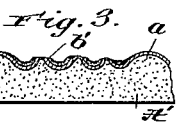
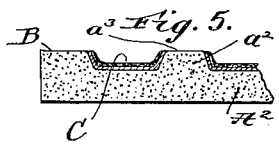
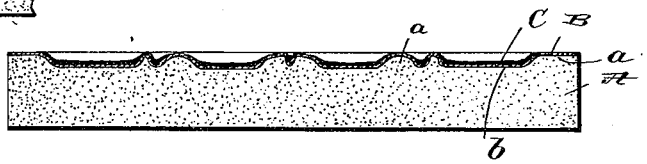
Witnesses:
Inventor
Henry C. Mercer
By James J. Sheehy
Attorney
THE NORRIS PETERS CO., PHOTO-LITHO., WASHINGTON, D. C.

UNITED STATES PATENT OFFICE.

HENRY C. MERCER, OF DOYLESTOWN, PENNSYLVANIA.

TILE AND PROCESS OF PRODUCING SAME.

SPECIFICATION forming part of Letters Patent No. 644,530, dated February 27, 1900.

Application filed July 3, 1899. Serial No. 722,725. (No model.)

*To all whom it may concern:*

Be it known that I, HENRY C. MERCER, a citizen of the United States, residing at Doylestown, in the county of Bucks and State of Pennsylvania, have invented new and useful Improvements in Tiles and Processes of Producing the Same, of which the following is a specification.

My invention relates to pottery, and more particularly to those mural tiles which have raised portions or portions in rilievo, and also to the making thereof.

It consists in a simple, inexpensive, and expeditious process whereby when one or more than one layer of slip is employed on the face of the base of the tile or other article of pottery the raised portion or portion of the tile or other pottery article in rilievo is made to contrast in color to the ground portion thereof.

With the foregoing in mind the invention will be fully understood from the following description and claims when taken in conjunction with the annexed drawings, in which—

Figure 1 is a face view of a tile made in accordance with my invention. Fig. 2 is a transverse section taken in the plane indicated by the line 2 2 of Fig. 1. Figs. 3, 4, and 5 are enlarged detail sections illustrative of modifications hereinafter referred to.

Referring by letter to the said drawings, and more particularly to Figs. 1 and 2 thereof, A is a base, of common red brick or other clay, which is provided with a suitable design made up of a raised portion $a$ and a ground portion $b$.

B is a layer of clay cream or slip applied to the face of the base, the said slip being by preference thick and sticky and calculated to become very hard when dry.

C is a thin layer of slip which is of a color or calculated to produce a color contrasting with that of the slip B and is also of a mealy character.

In carrying out my invention I produce a design made up of the raised portion $a$ and the ground or depressed portion $b$ on the face of the base by any of the modes well-known in the art, and entirely cover the said face with a layer B of clay cream or slip and permit the latter to dry. When the layer of clay cream or slip B is dry, the slip C is poured over or otherwise suitably applied to said layer B and permitted to dry. I then rub the slip C off the raised portion $a$ of the design to a greater or less extent, according to the clearness with which it is desired to have the clay cream or slip B on said raised portion stand out, with a piece of chamois-skin or other material suitable to the purpose. With this done heat is applied to the tile—that is, the same is baked or fired in the manner well-known in the art—when by virtue of the slip C having been wiped or rubbed off the raised portion $a$ of the design said raised portion will contrast with the ground portion $b$.

I prefer to have the clay cream or slip B white or light in color and the slip C of a dark color or calculated to produce a dark color, because when the slip C is wiped off the raised portion of the design said raised portion is made very prominent.

I prefer to apply the layer of slip C to the layer of slip B prior to the burning of the tile, but do not desire to be understood as confining myself to the same, as said layer of slip C might be applied subsequent to the burning or firing of the tile and after drying might be rubbed off the raised portion of the design in the manner before described. I also desire it understood that I do not confine myself to rubbing the slip C off the raised portions of the design. Under some conditions it might be scraped off with the longitudinal edge of a piece of wood or other material or with a brush having very short bristles, the principle being always the same—viz., quickly skimming across the raised portions of the design and leaving the depressed portions untouched.

When the slip B is thick and sticky and calculated to become very hard when dry and the slip C is thin and of a mealy character, the wiping, rubbing, or scraping of the said slip C from the raised portion of the design and the exposition of the white or light-colored slip B on said raised portion may be expeditiously accomplished.

The face of the tile is preferably glazed, as usual; but I do not desire to be understood as confining myself to the same, as the article produced in accordance with my invention is complete without such step.

It will be appreciated from the foregoing that my improved tile may be produced very cheaply, inasmuch as the base A may be formed of low-grade clay—red brick clay, for instance—and it is only necessary to employ enough of the comparatively-expensive cream clay or slip B to cover the face of the base and enough of the color or color-producing slip C to produce the desired color effect.

In the embodiment of the invention shown in Figs. 1 and 2 both the ground $b$ and raised portion $a$ of the design are smooth, and the layer of slip B is of an even thickness throughout, with the result that the color of the base A, which is red in this instance, is prevented from showing through the inner layer B of white or light-colored slip. If, however, the slip B on the raised portion $a$ of the design be rubbed with sandpaper or other abrasive material or scraped to a greater or less extent, the color of the base A will tint the slip B on said raised portion $a$, and thereby enhance the beauty of the tile.

In Fig. 3 is shown a modification in which the base A' is provided on its face with a design made up of a raised portion $a$ and a rough ground portion $b'$. When the layer B of cream clay or slip, made thin for the purpose, is applied to the said face of the base, but little, if any, of the same will remain on the ends of the protuberances of the rough ground portion of the design, and hence when the slip C is subsequently applied to the layer B, with the same result as in case of layer B, and rubbed off the raised portion $a$ and the protuberances of the rough ground portion $b'$ the base A', which is red in this instance, will be more or less exposed at various points and a flecked or stippled and very beautiful effect produced. In this instance both slips act the same, although B, being thicker, shows it much less than C. Both tend to collect in the minor hollows of the rough general surface and enhance the stippled effect, which is not seen where the general surface is smooth. When it is desired to expose the base A' at various points on the raised portion of the design, the same may be accomplished by rubbing or scraping more or less of the layer of slip B off said raised portion at the points desired or by making said raised portion rough, as indicated by $a'$ in Fig. 4, in which latter case but little, if any, of the layer of slip B will be deposited on the extremities of the protuberances, and when the layer of slip C is rubbed or scraped off the raised portion and the protuberances of the design the base A' will be exposed at points in the manner and for the purpose before described. This effect is also produced by making the slip B thin, which renders it more apt to run off the high parts, leaving but a thin film there, and enables the body to burn through and tinge it. To hold its color over the more fusible body below it, the slip B should be about as thick as thin molasses. If it is made of the consistency of poor cream, the body color burns through, particularly on the high parts.

In the embodiments of the invention disclosed in Figs. 3 and 4 it will be observed that the tile is decorated with three colors with no more labor and expense than when two colors are exposed. It will also be observed that the flecked or stippled effect is produced by the rubbing or scraping of the layer of slip C from portions of the design, which operation is rendered easy by the irregular and rough impression on the clay base. The collection of the colored or color-producing slip in the depressions of the design and its removal from the numerous raised portions thereof result in an antique effect, which greatly enriches the vividness and charm of the coloring of the tile. Such disposition of the color or color-producing slip is also advantageous, because it is different in each tile, thus avoiding flatness and sameness or monotony in a large surface of mural tiles.

In Fig. 5 is shown a modification in which the slips B and C are used in conjunction with a clay base $A^2$, and both are entirely rubbed, scraped, or otherwise removed from the raised portion $a^2$ of the design, and the surface of the said raised portion is rubbed off, as indicated by $a^3$, so as to expose the varying color of the clay base. The layers B C may be and preferably are rubbed off the raised portion of the design with sandpaper or other abrasive substance or scraped off with a piece of stick, and when they contrast in color with each other and the clay base and the tile is glazed a very rich and beautiful effect is obtained.

In all of the embodiments of my invention where the two layers of slip B C are employed toning or variation in shade may be obtained by harder or lighter rubbing, scraping, or removing of the layers to reduce the thickness of layer B or by rubbing when the color or color-producing layer C is not quite dry and is consequently adapted to mix with the layer of slip B and tint the latter.

All of the tiles described are designed to be used as mural tiles for interior decoration and are therefore, preferably, glazed in the ordinary well-known manner.

In those embodiments of my invention in which the dark color or color-producing slip is applied to a hard white or light-colored surface I prefer to employ the base of common clay and the layer of white or light-cream clay or slip thereon for the reasons stated. I also desire it understood that in those embodiments of the invention in which the clay base is exposed any fusible clay may be used to form the said base, and, further, that it may be used in its natural state or may be colored by any of the modes well known in the art, as desired.

Having thus described my invention, what I claim is—

1. The method of making and ornamenting pottery which consists in forming a clay base with a design having raised and ground portions, covering the design with a layer of slip, then applying a second layer of slip of different color from the first, and then removing the second layer of slip from the raised portions of the design and thereby exposing the first layer of slip on said raised portions.

2. The method of making and ornamenting pottery which consists in forming a clay base with a design having raised and ground portions, covering the design with a layer of slip contrasting in color with the base and of a hard, close-grained nature when dry, then, after the drying of said hard layer, applying a second layer of slip of different color from the first and of looser and more friable nature, and then removing the second layer of slip from the raised portions of the design.

3. The method of making and ornamenting pottery which consists of forming a clay base with a design having raised and ground portions, covering the design with a layer of slip contrasting in color with the base, then applying a second layer of slip of different color from the first, and then removing the second layer of slip and portions of the first layer from the raised portions of the design.

4. The method of making and ornamenting pottery which consists in forming a clay base with a design having raised and ground portions, covering the design with a layer of slip contrasting in color with the base and of a hard, close-grained nature when dry, then, after the drying of said hard layer, applying a second layer of slip of different color from the first and of looser and more friable nature, and then removing the second layer of slip and portions of the first layer from the raised portions of the design.

5. The method of making and ornamenting pottery which consists of forming a clay base with a design having raised and ground portions, covering the design with a layer of slip contrasting in color with the base, then after the drying of said layer applying a second layer of slip of different color from the first, then removing the second layer of slip and portions of the first layer from the raised portions of the design and finally firing the pottery.

6. The method of making and ornamenting pottery which consists of forming a clay base with a face having a rough portion, covering the said base with a layer of slip contrasting in color with the base, then applying a second layer of slip of different color from the first, and then removing the second layer of slip from the protuberances of the rough portion of the face whereby a flecked or stippled effect is produced.

7. The method of making and ornamenting pottery which consists of forming a clay base with a design having raised and ground portions, covering the design with a layer of slip contrasting in color with the base, then after the drying of said layer applying a second layer of slip of different color from the first then removing the second layer of slip and portions of the first layer from the raised portions of the design by abrasive action and finally firing the pottery.

8. The method of making and ornamenting pottery which consists of forming a clay base with a design having raised and ground portions, covering the design with a layer of slip contrasting in color with the base, and of a hard close-grained nature when dry, then, after the drying of said hard layer, applying a second layer of slip of different color from the first and of looser and more friable nature when dry than the first, then removing the second layer by attrition from the raised portions of the design and finally firing the pottery.

9. The method of making and ornamenting pottery which consists in forming a clay base with a design having raised and ground portions one of which has again a rough or irregular face, covering the design with a layer of slip contrasting in color with the base, then applying a second layer of slip of different color from the first, and then removing the second layer of slip from the raised portion and the protuberances of the rough or irregular portion of the design, substantially as specified.

In testimony whereof I have hereunto set my hand in presence of two subscribing witnesses.

HENRY C. MERCER.

Witnesses:
PAUL H. APPLEBACH,
FREDERICK STUCKERT.